United States Patent
Normoyle et al.

(10) Patent No.: US 6,477,622 B1
(45) Date of Patent: Nov. 5, 2002

(54) SIMPLIFIED WRITEBACK HANDLING

(75) Inventors: Kevin B. Normoyle, Santa Clara, CA (US); Meera Kasinathan, Sunnyvale, CA (US); Rajasekhar Cherabuddi, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 121 days.

(21) Appl. No.: 09/670,856

(22) Filed: Sep. 26, 2000

(51) Int. Cl.[7] .............................................. G06F 12/00
(52) U.S. Cl. ........................ 711/143; 711/141; 711/146
(58) Field of Search ........................... 711/140–146, 117

(56) References Cited

U.S. PATENT DOCUMENTS

| | | | | |
|---|---|---|---|---|
| 5,293,603 A | * | 3/1994 | MacWilliams et al. | 711/117 |
| 5,623,628 A | * | 4/1997 | Brayton et al. | 711/141 |
| 5,809,530 A | * | 9/1998 | Samra et al. | 711/140 |

* cited by examiner

Primary Examiner—Do Hyun Yoo
Assistant Examiner—Nasser Moazzami
(74) Attorney, Agent, or Firm—William L. Paradice, III

(57) ABSTRACT

The main cache of a processor in a multiprocessor computing system is coupled to receive writeback data during writeback operations. In one embodiment, during writeback operations, e.g., for a cache miss, dirty data in the main cache is merged with modified data from an associated write cache, and the resultant writeback data line is loaded into a writeback buffer. The writeback data is also written back into the main cache, and is maintained in the main cache until replaced by new data. Subsequent requests (i.e., snoops) for the data are then serviced from the main cache, rather than from the writeback buffer. In some embodiments, further modifications of the writeback data in the main cache are prevented. The writeback data line in the main cache remains valid until read data for the cache miss is returned, thereby ensuring that the read address reaches the system interface for proper bus ordering before the writeback line is lost. In one embodiment, the writeback operation is paired with the read operation for the cache miss to ensure that upon completion of the read operation, the writeback address has reached the system interface for bus ordering, thereby maintaining cache coherency while allowing requests to be serviced from the main cache.

18 Claims, 5 Drawing Sheets

SIMPLIFIED WRITEBACK HANDLING

BACKGROUND

1. Field of Invention

This invention relates generally to microprocessors and specifically to improving cache coherency performance in a multi-processor system.

2. Description of Related Art

Caches are used in many computer systems to improve performance. A cache is a storage area that is faster to access by a central processing unit (CPU) than main memory. Typically, the first time an address is referenced by the CPU, the corresponding data is fetched from main memory and written into the cache. Once a cache line is loaded, subsequent reads of that same address by the processor can simply access the cache, as opposed to having to access main memory.

A cache typically includes a plurality of cache lines, each of which has an associated cache tag and cache flags. The tag indicates the address in main memory corresponding to the cache line, and the flags indicate the status of the cache line. Typically, tag and status information for a cache are stored in a separate, searchable array such as, for instance, a content addressable memory (CAM) array. When cached data is updated by the CPU, its status is changed to indicate that the data is "dirty". The updated data is typically written back to main memory in a writeback operation.

In a writeback cache scheme, the updated value of the cache line is not sent to main memory until a cache replacement occurs. A cache replacement occurs when the CPU needs to access another memory location that is not in the cache, and thus must free up space in the cache to make room for the new data. A cache controller selects the cache line that is to be used for the new data. The CPU looks at the status flags associated with the cache line being replaced and determines if the cache line has been modified while in the CPU. If the cache line has been modified, the updated data must be saved back to main memory in order to maintain data coherency. Conversely, if the cache line being replaced has not been modified, no update of main memory is required, and the selected cache line is replaced by the new data.

The process of writing updated data to main memory is called a writeback, and typically uses a special buffer called a writeback buffer to temporarily store the updated data from the cache line being replaced, so that the cache line is free to accept the new data when it is fetched from main memory into the cache. During writeback, the dirty cache line selected for replacement is queued in the writeback buffer, and the selected cache line is invalidated and replaced by the new data. The writeback buffer has an associated searchable tag array such as a CAM array to store tag and status information for writeback data queued in the writeback buffer. Data in the writeback buffer is thereafter written to main memory.

If another CPU in a multi-processor system needs data at the same address, it requests the updated data from the first CPU. If the first CPU owns the requested data, i.e., the requested data has been modified by the first CPU but not yet written back to main memory, the first CPU loads the updated data into a copyback buffer, and the cache line is invalidated if necessary. Copyback data queued in the copyback buffer is thereafter provided to the second CPU over the system bus. Tag and status information associated with the copyback data is stored in a searchable tag array associated with the copyback buffer.

Although the writeback and copyback buffers advantageously free cache resources during copyback requests, updated data may be in the main cache, in the writeback buffer, or in the copyback buffer. Accordingly, when a copyback request is received, tag information associated with the request must be compared with tags in the main cache tag array, the writeback tag array, and the copyback tag array to determine whether the requested data is in the snooped CPU. The search overhead required to snoop the main cache, the writeback buffer, and the copyback buffer is expensive, and may consume a significant amount of silicon area. Accordingly, it would be desirable to reduce the amount of search overhead required for such snoop operations.

Further, in instances where the modified data requested by another CPU is in transition towards the system bus, e.g., between the main cache and the writeback buffer during a writeback operation, it may be difficult to search for and capture the requested data. For example, even if the requested data is located, the requested data may again transition closer to the system bus, e.g., read out of the writeback buffer, before the snoop results are acted upon. To alleviate this difficulty, the writeback operation is typically stalled during snoop operations so that the requested data remains stationary. Unfortunately, stalling the writeback operation degrades performance. Accordingly, it would also be desirable to be able to easily locate and capture modified data without stalling the writeback operation.

SUMMARY

A method and apparatus are disclosed that reduce search overhead for snoop operations during, for example, copyback operations. In accordance with the present invention, the main cache of a processor in a multiprocessor computing system is coupled to receive writeback data during writeback operations. In one embodiment, during writeback operations, i.e., in response to a cache miss, dirty data in the main cache is merged with modified data from an associated write cache, and the resultant writeback data line is loaded into a writeback buffer. The writeback data is also written back into the main cache. In some embodiments, further modifications of the writeback data in the main cache are prevented. The writeback data line in the main cache remains valid until read data for the cache miss is returned, thereby ensuring that the read address reaches the system interface for proper bus ordering before the writeback data is replaced. The writeback operation may be paired with the read operation for the cache miss to ensure that upon completion of the read operation, the writeback address has reached the system interface for bus ordering, thereby maintaining cache coherency while allowing requests to be serviced from the main cache.

By maintaining a copy of the writeback data in the main cache during writeback operations, subsequent requests for the data need only be snooped for in the main cache, thereby eliminating the need for search overhead for the writeback buffer. Accordingly, since present embodiments snoop only tag information for the main cache during data requests, the size of the tag array required for snooping is smaller, and less expensive, than prior searchable tag arrays that store tag information for the main cache and the writeback buffer. In addition, since snoop operations are serviced from the main cache, it is not necessary to stall the writeback operation for snoop operations, which in turn increases performance over prior art systems that stall the writeback operation for such snoop operations.

BRIEF DESCRIPTION OF THE DRAWINGS

Like reference numerals refer to corresponding parts throughout the drawing figures.

DETAILED DESCRIPTION

Figure 1:
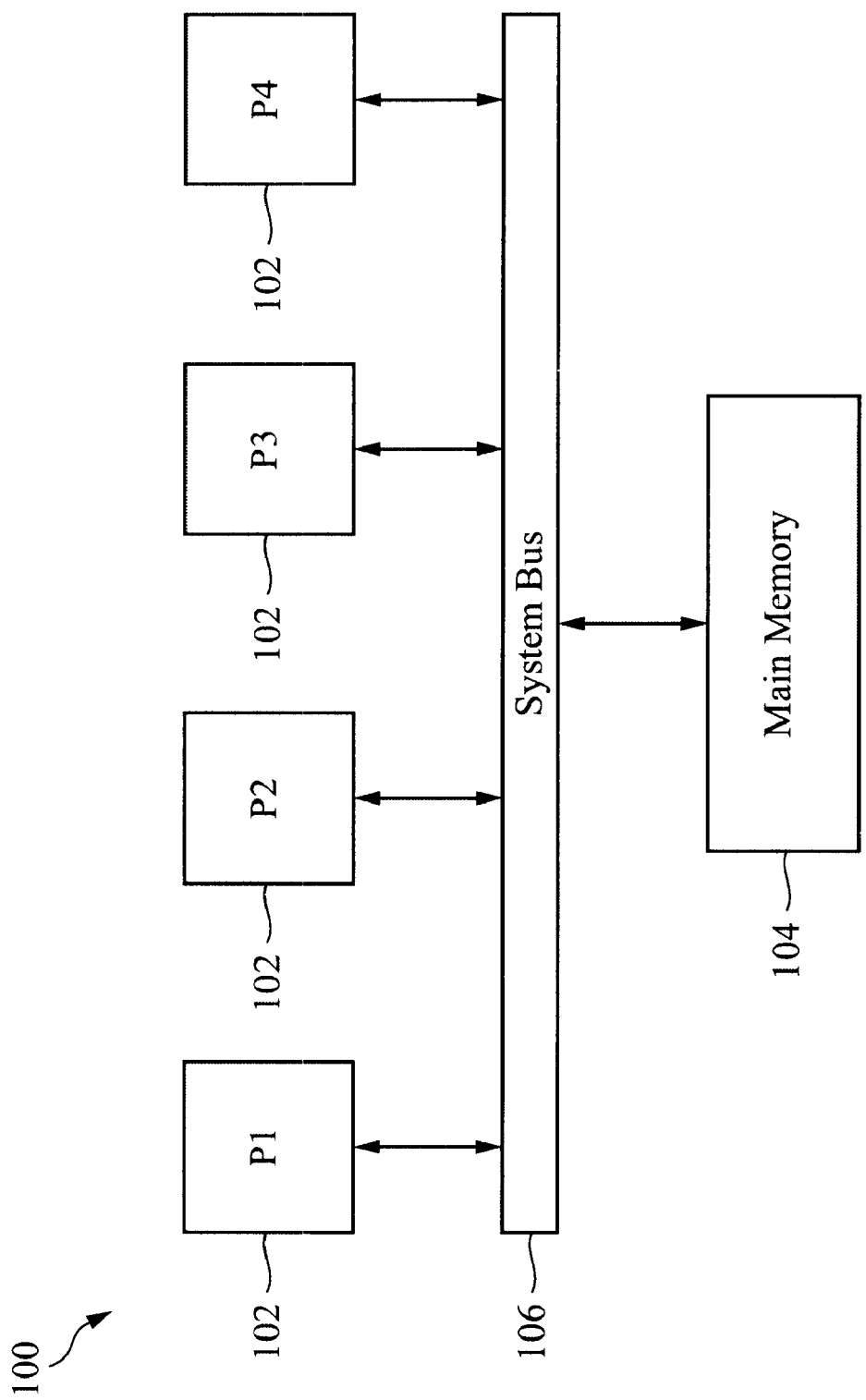
FIG. 1 is a diagram of a multi-processor computing system according to the present invention.

FIG. 1 shows a multi-processor computer system 100 which may be configured to implement embodiments of the present invention. Multi-processor computer system 100 includes a plurality of processors 102 connected to each other and to a main memory 104 via a system bus 106. In some embodiments, processors 102 are super-scalar processors. Main memory 104 is a volatile memory such as, for instance, DRAM, that stores instructions and data of a computer program(s) executing on one or more of processors 102. Although shown in FIG. 1 as a shared memory, in other embodiments main memory 104 may be a distributed memory where each processor 102 directly accesses an associated main memory 104 without using system bus 106.

Figure 2:
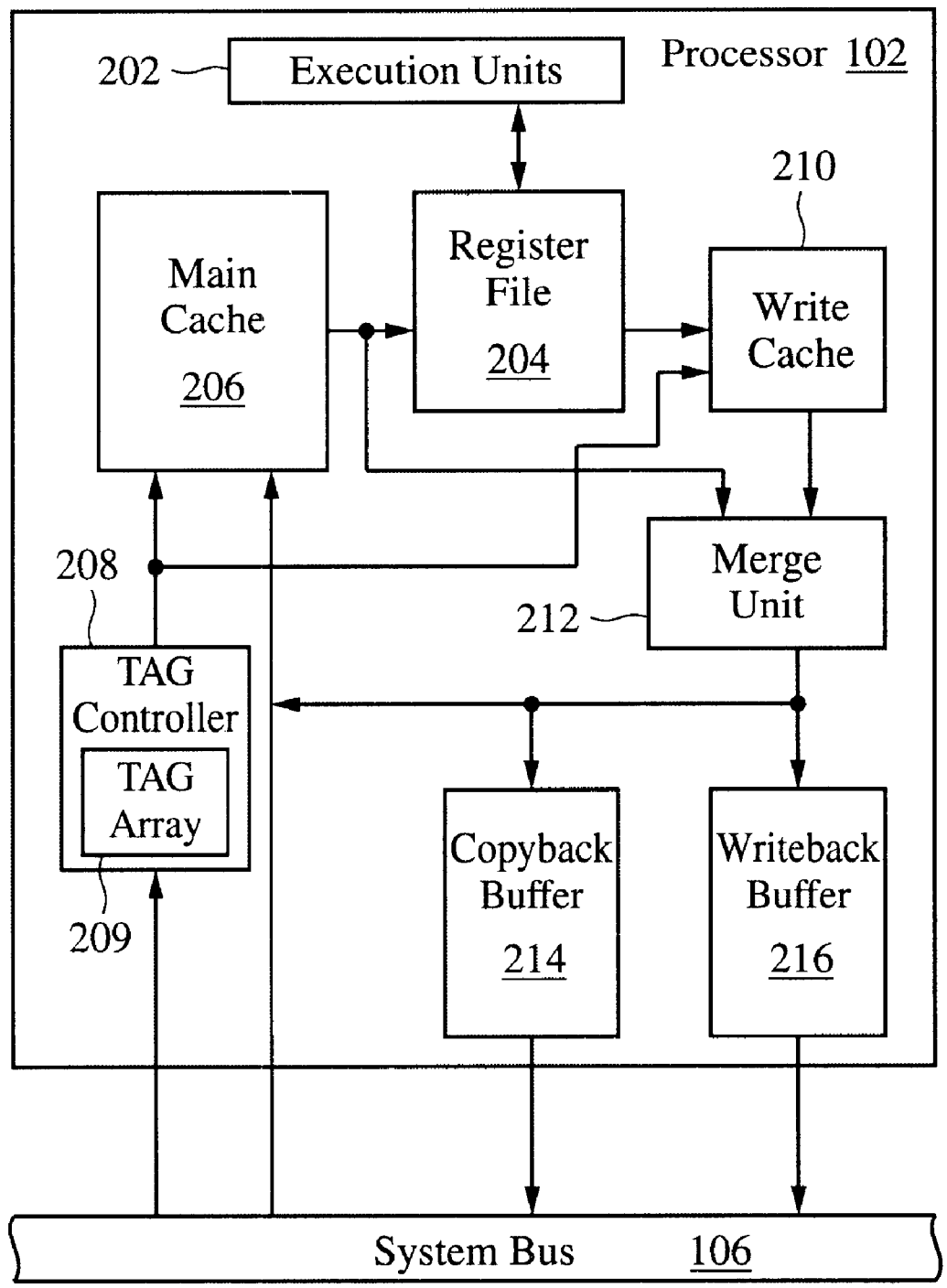
FIG. 2 is a block diagram of an individual processor in the multi-processor computing system of FIG. 1.

FIG. 2 shows one embodiment of processor 102 including processor execution units 202, a register file 204, a main cache 206 and associated tag controller 208, a write cache 210, a merge unit 212, a copyback buffer 214, and a writeback buffer 216. Main cache 206, which is preferably an SRAM, includes a write port coupled to system bus 106 and to a read port of merge unit 212, and includes a read port coupled to write ports of register file 204 and merge unit 212. Main cache 206 includes a plurality of cache lines to store instructions and/or data fetched from main memory 104, for example, in response to a cache miss during execution of the computer program. In one embodiment, main cache 206 has 16 k 32-byte cache lines. Although shown in FIG. 2 as having only one write port, in some embodiments main cache 206 may have one write port coupled to system bus 106, and another write port coupled to merge unit 212.

Figure 3:
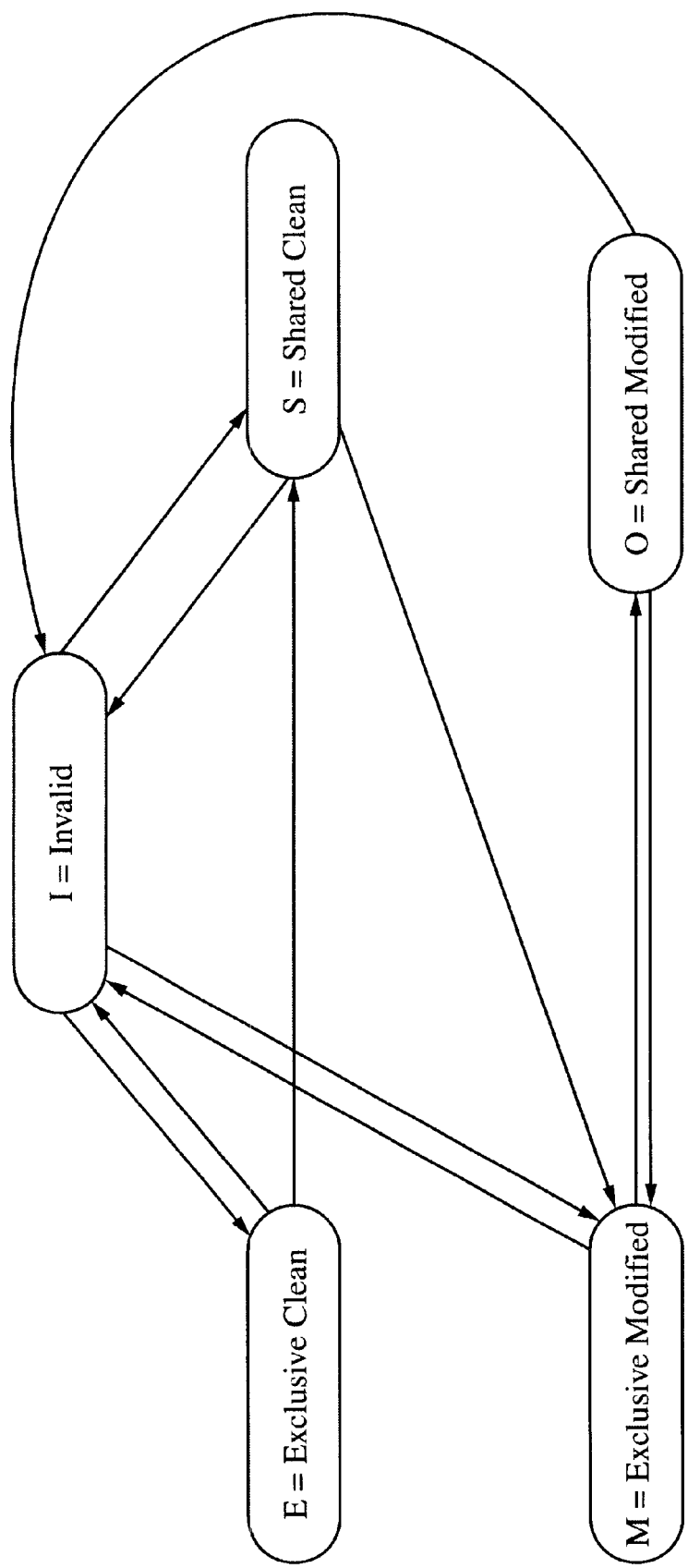
FIG. 3 is a state diagram illustrating various states of status information for data cached in the processor of FIG. 2.

Tag controller 208 includes a searchable tag array 209 having a plurality of line entries for storing tag and status information for corresponding cache lines in main cache 206. Tag array 209, which in one embodiment is a CAM array, receives tag and status information corresponding to fetched data from system bus 106. Tag controller 208 receives snoop requests from other processors 102 via system bus 106, and provides writeback and copyback commands to main cache 206 and to write cache 210. Tag controller 208 may implement any well-known cache coherency protocol to maintain cache coherency throughout system 100. In one embodiment, tag controller 208 uses a cache coherency protocol known as the MOESI protocol, which includes five states for data stored in main cache 206. The states include Modified (M), Owned (O), Exclusive (E), Shared (S), and Invalid (I), as illustrated in FIG. 3. Other cache coherency protocols may be used.

Register file 204, which may be an architectural register file, stores instructions and/or data provided by main cache 206 for processing by execution units 202. Although not shown in FIG. 2, register file 204 may be associated with a well-known re-order buffer and/or other circuitry to allow for out-of-order execution. Executions units 202 are well-known and include, for example, arithmetic logic units (ALUs), to process data provided by register file 204.

Write cache 210 includes a write port coupled to a read port of register file 204, and includes a read port coupled to merge unit 212. Write cache 210 is byte writeable, and receives one or more data bytes modified by execution units 202 from register file 204. In one embodiment, write cache 210 is an SRAM and includes 32 cache lines.

Merge unit 212 merges modified data bytes from write cache 210 with corresponding dirty data from main cache 206 to generate writeback data in a well-known manner. Merge unit 212 includes a read port coupled to respective write ports of main cache 206, copyback buffer 214, and writeback buffer 216. In some embodiments, main cache 206, write cache 210, and merge unit 212 form an integrated cache unit.

Copyback buffer 214 stores copyback data that is to be routed to a requesting processor 102 via system bus 106 during a copyback operation, and writeback buffer 216 stores writeback data that is to be written back to main memory 104 via system bus 106 during a writeback operation. In one embodiment, copyback buffer 214 and writeback buffer 216 are the same buffer. Copyback buffer 214 includes or is associated with a tag buffer that stores tag and status information for corresponding copyback data queued in copyback buffer 214. Similarly, writeback buffer 216 includes or is associated with a tag buffer that stores tag and status information for corresponding writeback data queued in writeback buffer 216. In some embodiments, the tag buffers for copyback buffer 214 and writeback buffer 216 are included within tag controller 208. However, as explained below in detail, since in present embodiments tag information associated with data queued in copyback buffer 214 and writeback buffer 216 are not searched during snoop operations, the tag and status information for copyback buffer 214 and writeback buffer 216 do not need to be stored in searchable arrays, and can instead be stored in less expensive buffers, thereby reducing cache search overhead.

When data is fetched from main memory 104 into a cache line of main cache 206, corresponding tag and status information is loaded into the cache tag array 209. Initially, =the fetched data is cached in a clean state, e.g., either E or S. For example, if no other processor 102 owns the data, the data is cached in the E state. If another processor also has the data, it is cached in the S state. Data subsequently modified by execution units 202 is provided from register file 204 to write cache 210. Corresponding status information in tag array 209 is changed to either the M or O state to indicate that the cache line in main cache 206 is dirty.

A writeback operation may be initiated upon a cache miss. A read miss occurs when a read request is made by processor 102 and main cache 206 does not contain the information associated with the read request. Tag controller 208 selects a cache line in main cache 206 that is to be removed to make room for the new data line. If the selected cache line is clean, it is invalidated, and replaced by the new data without a writeback operation. The cache line to be removed may be selected using any well-known replacement algorithm.

If the selected cache line is dirty, tag controller 208 issues a writeback command, and sends merge instructions to main cache 206 and write cache 210 to initiate a data merge. In response thereto, the selected cache line of main cache 206 is read out from main cache 206 and merged in merge unit 212 with modified portions of the data from a corresponding line in write cache 210 to generate an updated data line, i.e., the writeback data. The writeback data is queued in writeback buffer 216 for subsequent writeback to main memory 104. The writeback data from merge unit 212 is also written back into the selected cache line of main cache 206, and corresponding status information stored in tag array 209 is updated to the O state to prevent subsequent stores to the data. After completion of the writeback to main memory 104, the new data line is returned to main cache 206, and the selected cache line is invalidated and thereafter replaced with the new data. As explained in detail below, by maintaining writeback data in main cache 206, subsequent requests for the data (e.g., a copyback request) may be serviced without snooping writeback buffer 216.

A copyback operation occurs when main cache 206 of a first processor (e.g., processor P1) contains data that has been updated but not yet written back to main memory 104, and another processor (e.g., processor P2) issues a request for that data. Since the requested data has been modified while in processor P1's main cache 206, processor P1 supplies the updated data to the requesting processor P2. The request from processor P2 is issued onto system bus 106 and received into tag controller 208 of each processor 102. Tag controller 208 compares tag information from the request to the main cache tags stored in searchable tag array 209 to determine if the requested data is in main cache 206. Since any data queued in writeback buffer 216 is also maintained in main cache 206, only main cache 206 is snooped.

If there is not a match, tag controller 208 alerts processor P2 via system bus 106 that it does not have the requested data. If there is a match, tag controller 208 determines the status of the cache line in main cache 206. If the cache line in main cache 206 is clean, tag controller 208 returns clean snoop results to processor P2 via system bus 106, and does not service the request.

On the other hand, if the cache line is dirty, tag controller 208 initiates a copyback command to copy data from processor P1 to processor P2. Processor P1's tag controller 208 sends merge instructions to main cache 206 and write cache 210 to initiate the merge operation, whereby the cache line in main cache 206 is copied and merged with corresponding modified data in write cache 210. Merge unit 212 provides the resulting updated data line, i.e., the copyback data, to copyback buffer 214, which queues the copyback data for subsequent copyback to processor P2 via system bus 106 in a well-known manner.

In some embodiments, if the request from processor P2 is a load operation, corresponding status information in tag array 209 is updated to the C state to retain ownership of the data. Conversely, if the request from processor P2 is a store operation, the cache line in main cache 206 is invalidated, and processor P2 now owns the data.

As explained above, during writeback operations, updated data is written not only to writeback buffer 216 but also back into main cache 206. Consequently, when tag controller 208 receives requests for data from other processors 102, tag controller 208 need only search tag information associated with main cache 206. That is, since in present embodiments data queued in writeback buffer 216 is also stored in main cache 206, writeback buffer 216 is not snooped for requested data. As a result, the searchable portion of tag array 209 need only contain tag information for main cache 206, and thus may be smaller than prior searchable tag arrays that contain tag information for main cache 206 and writeback buffer 216. Therefore, by not having to search writeback buffer 216 during snoop operations, the search overhead previously required for writeback buffer 216 may be omitted, thereby saving valuable silicon area.

Figure 4:
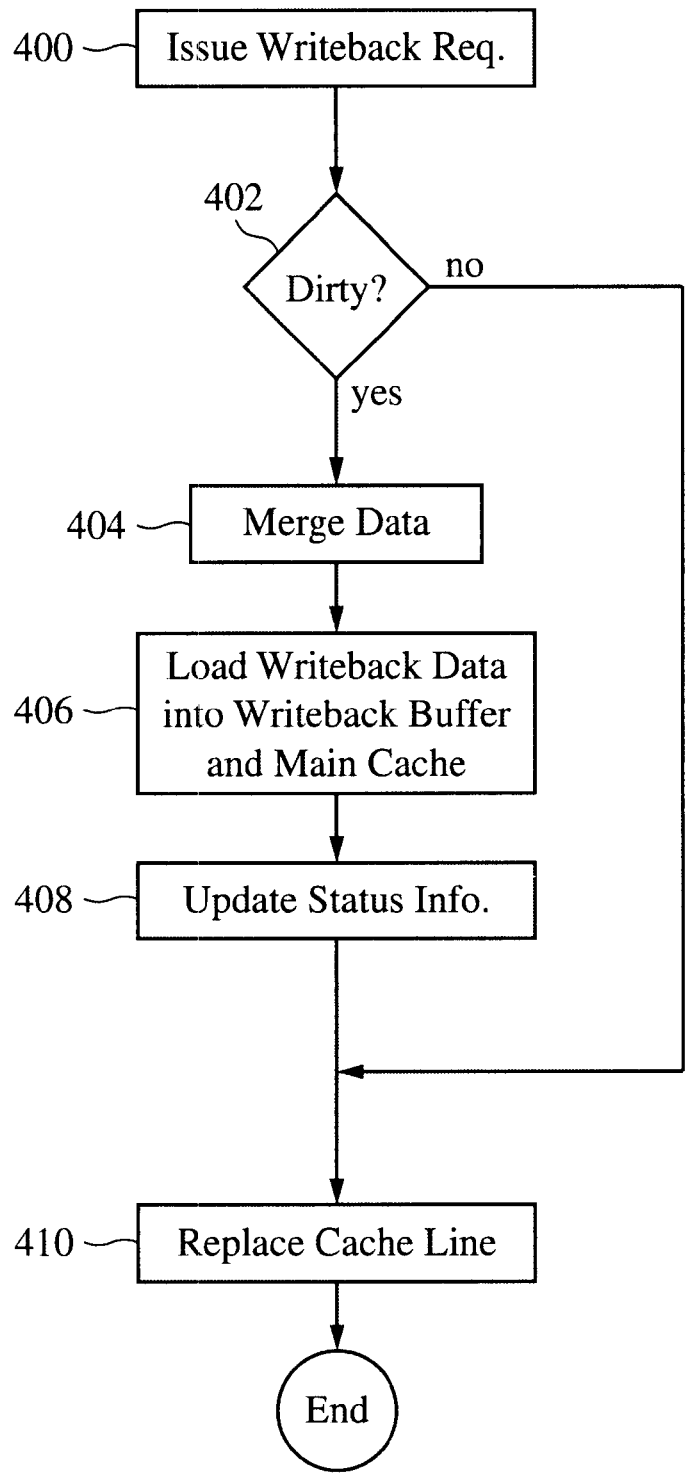
FIG. 4 is a flow chart of a writeback operation in accordance with one embodiment of the present invention.

Referring now to FIG. 4, a flow chart associated with a writeback operation according to a preferred embodiment of the present invention is shown. A writeback command is issued by tag controller 208 (step 400). If the cache line in main cache 206 selected to be replaced is not dirty, as tested in step 402, the selected cache line is replaced by new data. If the selected cache line is dirty, the selected cache line and corresponding modified data in write cache 210 are merged to generate the writeback data (step 404). The writeback data is loaded into writeback buffer 216, and is also written back into the selected cache line in main cache 206 (step 406). The status information for the selected cache line in main cache 206 is updated to the Owned state (step 408). While the writeback data is queued in writeback buffer 216, subsequent requests for the selected data will be serviced only from main cache 206. The writeback operation to main memory 104 thereafter completes, and the writeback data in main cache 206 is replaced with the new data (step 410).

Figure 5:
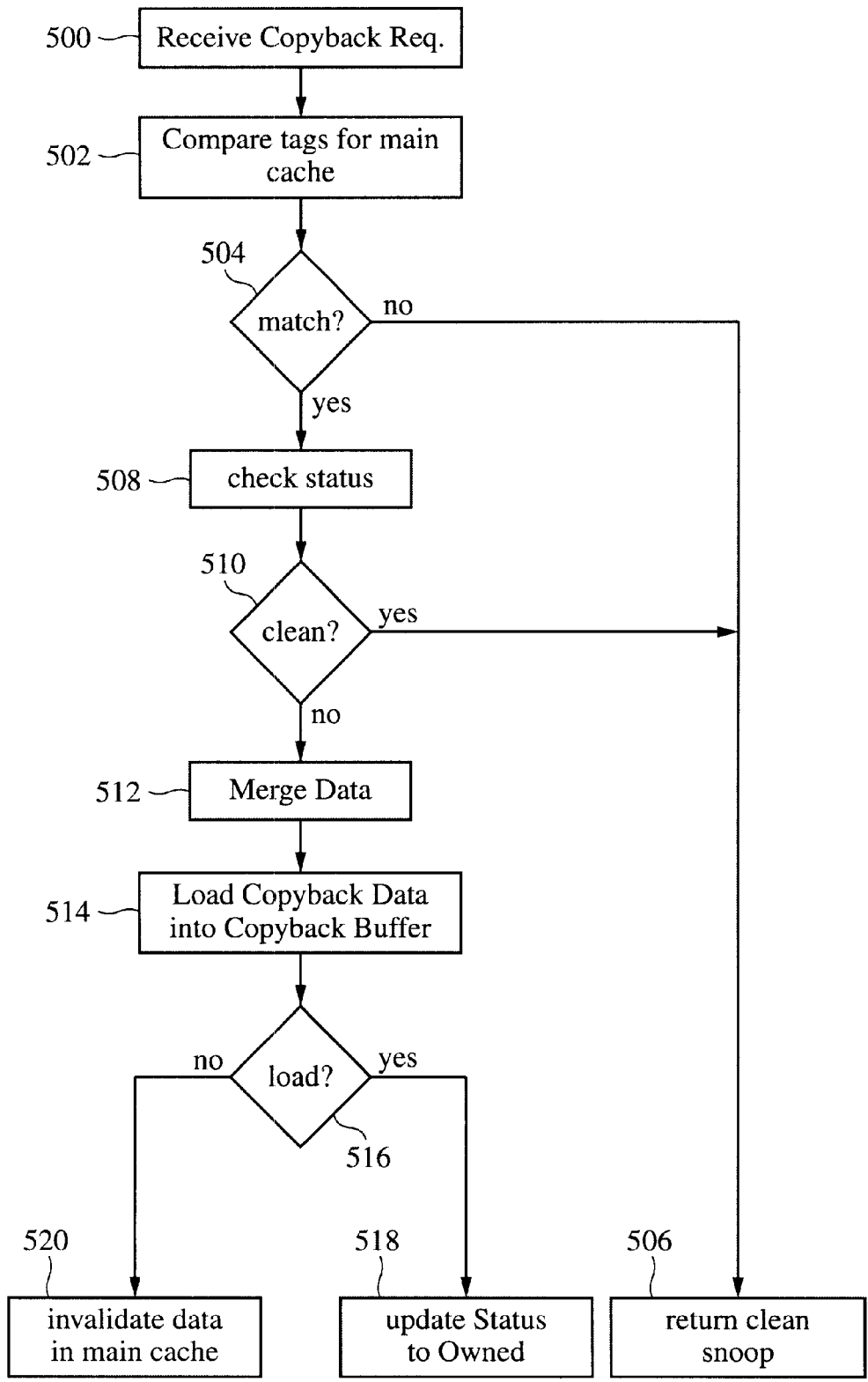
FIG. 5 is a flow chart of a copyback operation in accordance with one embodiment of the present invention.

Referring now to FIG. 5, a flow chart associated with a copyback operation according to a preferred embodiment of the present invention is shown. A copyback command is received into tag controller 208 (step 500). Tag information associated with the copyback request is compared with tag entries for main cache 206 (step 502). If there is not a match, as tested in step 504, tag controller 208 sends back clean snoop results to the requesting processor 102 (step 506). If there is a match, tag controller examines status information associated with the matching cache line (step 508). If the cache line is clean, as tested in step 510, tag controller 208 sends back clean snoop results to the requesting processor 102 (step 506). If the cache line is dirty, the cache line and corresponding modified data in write cache 210 are merged to generate the copyback data (step 512). The copyback data is loaded into copyback buffer 214 (step 514). If the copyback request is for a load operation, as tested in step 516, the status information for the cache line in main cache 206 is updated to the O state (step 518). If the copyback request is for a store operation, the corresponding cache line in main cache 206 is invalidated (step 520).

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For example, in some embodiments, copyback data may be written to both the copyback buffer and to the main cache during copyback operations in a manner similar to that described above with writing writeback data to the writeback buffer and the main cache during writeback operations.

We claim:

1. A method of handling a writeback in a processor of multi-processor computer system, the processor including a main cache, a write cache, and a writeback buffer, the method comprising:

selecting a cache line in the main cache to be replaced by newly fetched data;

if the selected cache line is dirty, merging the cache line with corresponding modified data in the write cache to generate writeback data;

loading the writeback data into the writeback buffer for subsequent writeback to a main memory and into the selected cache line of the main cache.

2. The method of claim 1, further comprising:

updating status information for the selected cache line in main memory to a shared state.

3. The method of claim 1, further comprising:

maintaining the writeback data in the main cache until a time after the writeback operation completes.

4. The method of claim 3, further comprising:

servicing subsequent requests for the writeback data from the main cache rather than from the writeback buffer.

5. The method of claim 4, wherein only the main cache is snooped during the subsequent requests.

6. The method of claim 5, wherein the subsequent request is a copyback request.

7. The method of claim 6, further comprising:

updating status information corresponding to the requested data in the main cache to an owned state if the copyback request is for a load operation.

8. The method of claim 6, further comprising:

invalidating the requested data in the main cache if the copyback request is for a store operation.

9. A processor system for improving writeback handling in a multi-processor computer system, at least one processor comprising:

a main cache for storing data;

a write cache for storing modified data;

a writeback buffer for storing writeback data; and a merge unit having write ports coupled to respective read ports of the main cache and the write cache, and having a read port coupled to the writeback buffer and to the main cache, wherein during a writeback operation the merge unit merges data from the main cache with modified data from the write cache to generate the writeback data, and loads the writeback data into both the writeback buffer and the main cache.

10. The system of claim 9, wherein the processor further comprises a searchable tag array containing tag information only for entries in the main cache.

11. The system of claim 9, wherein during a subsequent request for the data, only the main cache is snooped.

12. The system of claim 9, further comprising a copyback buffer having a write port coupled to the read port of the merge unit, the copyback buffer for storing copyback data.

13. The system of claim 12, further comprising a buffer for storing tag and status information for the copyback buffer and/or for the writeback buffer.

14. A processor system for improving performance during a writeback operation in a multi-processor computer system, at least one processor comprising:

a main cache having a read port and a write port, the main cache for storing frequently used data;

a register file having a write port coupled to the read port of the main cache, and having a read port;

a write cache having a write port coupled to the read port of the register file, and having a read port, the write cache for storing modified data;

a merge unit having a first write port coupled to the read port of the main cache, a second write port coupled to the read port of the write cache, and a read port coupled to the write port of the main cache; and a writeback buffer having a write port coupled to the read port of the merge unit, the writeback buffer for storing writeback data.

15. The system of claim 14, wherein during the writeback operation, writeback data generated by the merge unit is written to the writeback buffer and to the main cache.

16. The system of claim 15, wherein the processor further comprises a searchable tag array containing tag information only for entries in the main cache.

17. The system of claim 16, wherein the searchable tag array comprises a content addressable memory.

18. The system of claim 16, wherein during a subsequent request for the data, only the main cache is snooped.

* * * * *